UNITED STATES PATENT OFFICE.

HANS ALEXANDER, OF BERLIN, GERMANY, ASSIGNOR TO LOUIS POTTHOFF, OF LONG ISLAND CITY, NEW YORK.

COATING METALS BY ELECTROLYSIS.

SPECIFICATION forming part of Reissued Letters Patent No. 11,624, dated August 3, 1897.

Original No. 563,723, dated July 14, 1896. Application for reissue filed June 18, 1897. Serial No. 641,360.

*To all whom it may concern.*

Be it known that I, HANS ALEXANDER, Ph. D., a subject of the Emperor of Germany, residing at Berlin, Kingdom of Prussia, Germany, have invented certain new and useful Improvements in Coating Metals with Zinc, Tin, Tin and Zinc, also with Nickel and with Copper, of which improvements the following is a full, clear, and exact specification, disclosing the process and also the means and materials used therein.

My invention relates to coating or plating of metals as are subjected to rapid and permeating oxidation (iron and steel) galvanically with other metals, resisting the atmospheric influence, for the purpose of protecting such metals against disintegrating oxidation; and it consists of a process wherein basic salts of aluminium, or a basic salt of the metal to be used for the coating or plating, are used in the bath and the same metal is made the anode.

The processes heretofore known and used for galvanic zinc-plating do not produce an adhesive equally thick and lasting coat upon iron, and therefore a bath of molten metal is used for the purpose, though galvanic plating would for many reasons be preferable.

I have found that in plating of iron and steel (and also of other metals) with zinc the best results are obtained when the bath is prepared by saturating a (heated) solution of chlorid of aluminium with reguline zinc, whereby a plating is obtained containing a small percentage of aluminium, this addition of aluminium rendering the plating more compact, smooth, and durable.

My improved process for galvanic plating of iron and steel with zinc or tin or with other covering metals produces an equally thick, well-adhering coat, is equally effective for coating raw or finished cast and wrought iron and steel, and does not require any stronger electric current than commonly used for such purposes. This I obtain principally by using in the bath basic salts of aluminium by saturating the solution to its utmost capacity with the coating metal and adding to it some organic substance. The same metal is also used as the anode.

A sufficient neutralization of the bath is accomplished by saturating the solution of salt of aluminium with reguline metal and in the manner described above—that is, by using in an electrolytic bath basic salts of aluminium, saturating the bath to its utmost capacity with the coating metal, and using an anode made of the same coating metal. I produce upon the metal to be coated a deposit of the coating metal containing a small percentage of aluminium chemically combined with the coating metal. The addition of aluminium to the coating metal tends to greatly improve the quality, durability, and also the appearance of the coating.

For all kinds of iron a coating or plating composed of zinc or tin, or of zinc and tin, with a small percentage of aluminium added in the bath, will be found most suitable. The bath for such coating or plating of cast or wrought iron or of steel is prepared in the following manner:

First. I add to a solution containing in one hundred parts of water from five to eight per cent. of chlorid of aluminium as much reguline zinc (or tin, or of zinc and tin) as it will dissolve. While the metal is being dissolved, the solution must be kept constantly boiling, and the water evaporated in the process must be continually replaced. The saturation of the bath with the reguline metal is continued until no more of it is dissolved. Then a small quantity (from 0.2 to 0.3 per cent.) of chlorid of zinc (or of tin, or of both) is added and the heating of the bath continued for about thirty minutes longer, whereupon it is allowed to cool down and will be ready for use when cold.

Second. Instead of heating the solution of chlorid of aluminium and keeping it boiling while it is being saturated with the reguline metal, this may also be done electrolytically. In this case the reguline metal is made the anode and the action of the electric current continued until the bath is saturated with the dissolved metal to its fullest capacity.

Third. Instead of zinc or tin or zinc and tin the solution of chlorid of aluminium may be saturated with reguline aluminium. In speaking of "chlorid of aluminium" I mean such chlorid of aluminium as can be procured in the market at a reasonable price. This chlorid of aluminium is not chemically pure, always containing some free acid, and the reguline metal is added to the bath in order to bind (neutralize) this free acid. Chemically-pure chlorids of aluminium are so expensive that their use in this process would be impracticable for that reason. Then an equal quantity of chlorid of zinc (as chlorid of aluminium was used) is added, and after this is thoroughly dissolved and absorbed in the bath a further quantity (equal to 0.5 per cent. of the chlorid of aluminium used) of chlorid of tin is added, the bath kept boiling for about thirty minutes longer, and then allowed to cool down.

For producing galvanic depositions of copper, tin, and nickel, alloyed with aluminium, I use a bath containing a solution of chlorid of aluminium, saturated with reguline aluminium, to which I add a basic salt, preferably a sulfate of the metal to be used for coating; consequently for coating with copper, sulfate of copper; for coating with tin, sulfate of tin, and for coating with nickel, sulfate of nickel.

In all of these baths the coating metal (zinc, tin, tin and zinc, copper, or nickel) is made the anode. Instead of chlorids of the metals sulfates may be used as well. To prevent the precipitation of the salts of aluminium in these baths, I add some organic acid (citric or tartaric acids preferably) or some hydrate of carbon.

The addition of some organic acid to the bath prevents the precipitating of the salts of aluminium dissolved therein. Salts of aluminium are precipitated from a solution by alkaline metal salts. If, however, an organic acid is added, the precipitated salts of aluminium combine with the alkaline salts, forming double salts, easily soluble in water. This function of the organic acids is elaborately explained on page 62 of Medius's *Gewicht-Analyse*, published at Tubingen, 1887, and also on page 130 of Remigius Fresenius's *Anleitung zur Qualitativen Chemischen Analyse*, published by Vieweg & Son, Braunschweig, 1886, fifteenth edition. Aluminium is known to have a strong tendency to form basic salts. Basic salts are with difficulty soluble in water, and would therefore readily precipitate. By transforming them into double salts, which are easily soluble in water, the basic salts are maintained in solution. In order to improve the quality of the deposit of the coating metal, small quantities of chlorid or sulfate or of nitrate of mercury may be added. To improve the electrolytic conductivity, small quantities of alkaline salts may be added to the baths.

Having thus disclosed the nature and utility of my invention, I claim and desire to secure by Letters Patent—

1. An electrolytic bath for coating metals, composed of a solution of from five to eight parts of commercial chlorid of aluminium containing free acid in one hundred parts of water and of so much of reguline coating metal, as will dissolve therein, while the bath is heated to the boiling-point, and from two-tenths to three-tenths of a part of chlorid of the coating metal.

2. The process of preparing an electrolytic bath for coating of metals, consisting of following steps: first, dissolving a quantity of five to eight parts of chlorid of aluminium in one hundred parts of water; second, heating the solution to boiling, and while kept boiling, adding to it of such quantity of reguline coating metal, as will dissolve therein; third, adding to the solution of about two-tenths to three-tenths of a part of chlorid of the coating metal and keeping the bath boiling for about thirty minutes longer and then allowing it to cool down.

3. The process of galvanically coating metals, subjected to rapid oxidation, with metallic alloys, containing a small percentage aluminium, consisting in subjecting the metals to the action of an electric current in an electrolytic bath, composed of a solution of five to eight parts of commercial chlorid of aluminium, dissolved in one hundred parts of water and of so much of reguline metal as will dissolve therein, with some organic acid added to the bath, and using an anode, made of the metal, forming the principal component of the coating alloy.

In witness that I claim the improvements described in the foregoing specification I have signed my name in the presence of two subscribing witnesses.

HANS ALEXANDER.

Witnesses:
HENRY HASPER,
W. HAUPT.